Patented Aug. 26, 1924.

1,506,545

UNITED STATES PATENT OFFICE.

MAXIMILIAN P. SCHMIDT AND WILHELM NEUGEBAUER, OF BIEBRICH-ON-THE-RHINE, GERMANY, ASSIGNORS TO THE FIRM KALLE & CO., AKTIENGESELLSCHAFT, OF BIEBRICH, RHINE, GERMANY.

PERYLENTETRACARBOXYLIC ACIDS AND THEIR DERIVATIVES AND PROCESS OF MAKING THEM.

No Drawing.  Application filed September 1, 1922.  Serial No. 585,819.

*To all whom it may concern:*

Be it known that we, MAXIMILIAN P. SCHMIDT and WILHELM NEUGEBAUER, citizens of the German Republic, and residents of Biebrich-on-the-Rhine, Germany, have invented certain new and useful Improvements in Perylentetracarboxylic Acids and Their Derivatives and Processes of Making Them, of which the following is a specification.

We have found that by treating the coloring matters, obtainable by melting an imid of naphthalene-1.8-dicarboxylic acid or its derivatives with alkaline agents and oxidizing if necessary, with strong sulfuric acids at a higher temperature, the corresponding mono-imids of the perylentetracarboxylic acids or the perylentetracarboxylic acids themselves are formed. If the reaction takes place for a shorter time and at a lower temperature, of about 180–190° centigrade the monoimids of the perylentetracarboxylic acids are obtained, whereas at a higher temperature of about 210–240° centigrade the perylentetracarboxylic acids are formed. For instance from the dye-stuff described in Example 2 of the American specification 1,200,848, the perylentetracarboxylic acid itself or its monoimid is obtained. The process gives a good yield, so that it is a suitable technical process. To split open the imids of perylentetracarboxylic acids especially sulfuric acid of a higher concentration is preferred, but also fuming sulfuric acid may be employed.

The following examples will illustrate the invention which however is not in any way confined to these examples.

The parts are by weight—

(1) 10 parts of the coloring matter obtained by melting naphthalene-1.8-dicarboxylic acid with caustic potash (the diimid of the perylentetracarboxylic acid) are heated with 150 parts of sulfuric acid of 66° Bé. to about 180° centigrade during about 1 hour, while stirring. After the mass has cooled down, it is sucked off; the remaining brownish crystals are washed with about 25 parts of sulfuric acid of 60° Bé. and then with water. In this way the monoimid of the perylentetracarboxylic acid is obtained mixed with a part of the anhydride of the perylentetracarboxylic acid.

The sodium salt of the perylentetracarboxylic acid being easier soluble than that of the mono-imid of the perylentetracarboxylic acid, the two bodies may be separated in form of their sodium salts.

From the sodium salt the monoimid of the perylentetracarboxylic acid is precipitated by means of acids. When dried it is a red-brown powder soluble in very diluted solutions of alkali with an intense red color. From its alkaline solutions it is precipitated by means of small quantities of salt. In concentrated sulfuric acid it dissolves with a bluish-red color and a strong scarlet-red fluorescence. When heated with concentrated sulfuric acid at a higher temperature, it is transformed into the anhydride of perylentetracarboxylic acid.

(2) 1 part of the diimid of perylentecarboxylic acid (cfr. Example 1) is heated with 10–15 parts of concentrated sulfuric acid to about 210° centigrade. The bluish-red color of the solution disappears and changes to red-violet. At the same time dark needles are separated. After some time the mass is sucked off and washed. The brownish-red product obtained consisting of brown needles is the anhydride of the perylentetracarboxylic acid.

The compound dissolves completely in alkaline agents in the heat with a brownish-yellow color and a very strong fluorescence. The acid is precipitated from the alkaline solution by mineral acids in a yellow-brown and voluminous form. On heating the precipitate becomes red.

The presence of the perylentetracarboxylic acid is identified by the transformation of its calcium-salt into perylen, when heated in a dry state. The alkali-salts, especially the sodium-salt, are soluble only with difficulty.

With amines the acid forms vat dyestuffs.

(3) 20 parts of the diimid of tetrachloro-perylentetracarboxylic acid obtainable by treating the diimid of perylentetracarboxylic acid with chlorine, are introduced into about 350 parts of sulfuric acid of 66° Bé. and heated to 230° centigrade while stirring. The stirring is continued for about an hour at 230–235° centigrade, whereby the product of reaction already partly separates. After cooling the mass is sucked off.

The product obtained in the anhydride of a tetrachloroperylentetracarboxylic acid consisting of brownish-red glittering crystal-plates.

By the addition of ice to the acid motherlye a further quantity of the new-acid is precipitated.

The anhydride dissolves in alkali with a yellow color and green fluorescence. The alkali salts are easier soluble than those of the non-substituted acid. The calcium-salt is yellow and soluble only with difficulty.

If an alkaline solution of the tetrachlorinated acid is acidified in the cold the acid separates at first with a yellowish color, whereas on heating the orange-red anhydride is formed.

In concentrated sulfuric acid the anhydride dissolves with difficulty with a red color and scarlet-red fluorescence, in nitrobenzene with a brownish-red color and olive fluorescence.

We claim:

1. The process which consists in heating with a strong sulphuric acid an imid of a perylentetracarboxylic acid obtainable by melting an imid of a naphthalene-1.8-dicarboxylic acid.

2. As new products the anhydrides of the perylentetracarboxylic acids of the formula

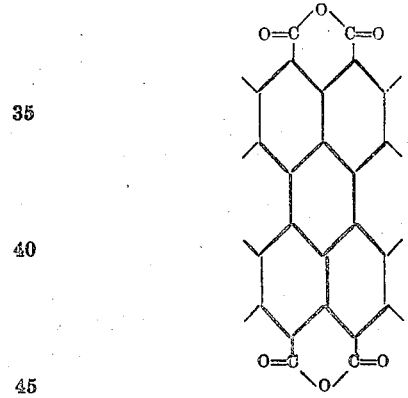

having a red-brown color, crystallizing in brown needles, soluble in alkaline agents with a yellow color of a strong fluorescence and in concentrated sulfuric acid with red color and orange-red fluorescence.

3. As new products the salts of the perylentetracarboxylic acids having a yellow color, being slightly soluble in water with a strong green fluorescence, being precipitated with acids in form of the free perylentetracarboxylic acid, changing into the corresponding anhydrides when heated.

4. As new products the monoimids of the perylentetracarboxylic acids of the following formula

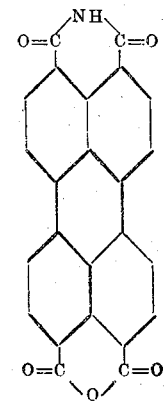

being red to brown powders, soluble with an intense red color in diluted alkaline solutions from which they are precipitated by means of salts, soluble in concentrated sulfuric acid with a bluish-red color and strong scarlet-red fluorescence, in which solution they are transformed into the anhydride of the perylentetracarboxylic acids when heated at a higher temperature.

In testimony whereof we affix our signature in presence of two witnesses.

Dr. WILHELM NEUGEBAUER.
Dr. MAXIMILIAN P. SCHMIDT.
Witnesses:
F. H. ANDERSON,
BASIL E. SAVARD.